(12) United States Patent
Sato et al.

(10) Patent No.: US 10,352,200 B2
(45) Date of Patent: Jul. 16, 2019

(54) CAM SHAFT

(71) Applicant: HONDA MOTOR CO., LTD., Tokyo (JP)

(72) Inventors: Fumio Sato, Tochigi (JP); Hiroshi Takeda, Tochigi (JP); Takuro Yoshimura, Tochigi (JP); Koji Saito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/763,306

(22) PCT Filed: Jul. 25, 2016

(86) PCT No.: PCT/JP2016/071749
§ 371 (c)(1),
(2) Date: Mar. 26, 2018

(87) PCT Pub. No.: WO2017/056657
PCT Pub. Date: Apr. 6, 2017

(65) Prior Publication Data
US 2018/0283223 A1    Oct. 4, 2018

(30) Foreign Application Priority Data
Sep. 30, 2015  (JP) .................................. 2015-193195

(51) Int. Cl.
*F01L 1/047*    (2006.01)
*F01L 1/053*    (2006.01)
(Continued)

(52) U.S. Cl.
CPC ............... *F01L 1/047* (2013.01); *F01L 1/053* (2013.01); *F01L 13/0047* (2013.01);
(Continued)

(58) Field of Classification Search
CPC ....... F01L 1/047; F01L 1/053; F01L 13/0047; F01L 1/344; F01L 2001/0476;
(Continued)

(56) References Cited

U.S. PATENT DOCUMENTS 5,090,366 A * 2/1992  Gondek .................... F01L 1/08
                                                                123/90.12
5,664,463 A   9/1997  Amborn et al.
(Continued)

FOREIGN PATENT DOCUMENTS

| JP | 7-102914 | 4/1995 | |
|---|---|---|---|
| JP | 2006144799 A * | 6/2006 | .............. F01L 1/047 |
| JP | 2008-530412 | 8/2008 | |

OTHER PUBLICATIONS

International Search Report, dated Oct. 25, 2016 (Oct. 25, 2016), 2 pages.

*Primary Examiner* — Mark A Laurenzi
*Assistant Examiner* — Wesley G Harris
(74) *Attorney, Agent, or Firm* — Rankin, Hill & Clark LLP (57) ABSTRACT

The present invention provides a camshaft capable of suppressing an increase in the number of parts and the number of places to be processed, preventing scratching on a sliding surface that is a part of an outer peripheral surface of an outer shaft and on which an inner cam is rotated, and preventing occurrence of deformation in the entire camshaft after final assembly. A camshaft includes an inner cam that is attached from a radial direction of an outer shaft and that is fixed to an inner shaft with a pin inserted into the inner cam from the radial direction of the outer shaft in a cam surface of the inner cam.

2 Claims, 11 Drawing Sheets

(51) Int. Cl.
    *F01L 13/00*     (2006.01)
    *F01L 1/08*     (2006.01)
    *B23K 101/00*     (2006.01)
    *B21D 53/84*     (2006.01)
    *F01L 1/344*     (2006.01)

(52) U.S. Cl.
    CPC ...... *B21D 53/845* (2013.01); *B23K 2101/005* (2018.08); *F01L 1/08* (2013.01); *F01L 1/344* (2013.01); *F01L 2001/0473* (2013.01); *F01L 2001/0476* (2013.01)

(58) Field of Classification Search
    CPC .. F01L 2001/0473; F01L 1/08; B21D 53/845; B23K 2101/005
    See application file for complete search history.

(56) References Cited

U.S. PATENT DOCUMENTS

| | | |
|---|---|---|
| 5,809,954 A | 9/1998 | Devine et al. |
| 7,958,859 B2 * | 6/2011 | Methley ............ F01L 1/047 123/90.17 |
| 8,448,617 B2 * | 5/2013 | Clever ............ F01L 1/047 123/90.15 |
| 2006/0011161 A1 * | 1/2006 | Lechner ............ F01L 1/08 123/90.17 |
| 2006/0174724 A1 | 8/2006 | Hoffmann et al. |
| 2007/0240657 A1 | 10/2007 | Schneider |
| 2008/0257290 A1 | 10/2008 | Lettmann et al. |

\* cited by examiner

CAM SHAFT

TECHNICAL FIELD

The present invention relates to a camshaft that includes a cam and changes an opening angle of a valve that is driven and opened or closed by the cam via a valve drive member.

BACKGROUND ART

Conventionally, a camshaft having a double structure and including a plurality of cams relatively rotatable with each other is known (for example, Patent Document 1). In the camshaft, an inner shaft is arranged inside a hollow outer shaft in a rotatable manner with respect to the outer shaft. An outer cam has an annular shape. The outer shaft is inserted in the outer cam, and the outer cam is fixed to an outer circumferential surface of the outer shaft. An inner cam has an annular shape, similarly to the outer shaft. The outer shaft is inserted in the inner cam, and the inner cam is fixed to the inner shaft with a pin. The pin penetrates a through hole formed in the outer shaft. The through hole is formed long in a peripheral direction of the outer shaft, and the inner shaft, the pin, and the inner cam are integrally rotatable in the peripheral direction of the outer shaft with respect to the outer shaft and the outer cam.

In manufacturing the camshaft, first, an end of the outer shaft in an axial direction of the outer shaft is inserted into the annular outer cam, and the outer cam is firmly fixed to the outer shaft by shrink fitting or the like. Next, the end of the outer shaft in the axial direction of the outer shaft is inserted into the annular inner cam, and a pin is brought to penetrate the inner cam, the through hole of the outer shaft, and the inner shaft to fix the inner cam to the inner shaft. The above steps are repeatedly performed to provide a predetermined number of outer cams and inner cams on the camshaft.

A method of use has been proposed in which, among camshafts having a double structure of an outer cam and an inner cam, a composite profile of a fixed cam (outer cam) and a movable cam (inner cam) is used by driving the same rocker arm by the outer cam and the inner cam arranged adjacent in an axial direction of an outer shaft and an inner shaft, and a cam profile is made variable in a pseudo manner. In that case, a profile of the fixed cam is basically used as a cam operation profile, and only a part with a shifted phase from the fixed cam is used as a profile of the movable cam.

Patent Document 1: Japanese Unexamined Patent Application (Translation of PCT Application), Publication No. 2008-530412

DISCLOSURE OF THE INVENTION

Problems to be Solved by the Invention

In a camshaft described in Patent Document 1, the number of components and the number of places to be processed is very large, and in addition, an assembly process is complicated. Further, since a clearance in shrink fitting and fixing the outer cam to the outer shaft is small, a sliding surface that is a part of an outer circumferential surface of the outer shaft, and where the outer cam passes through in allowing the outer shaft and a journal to be inserted therethrough, and on which the inner cam is rotated, may be scratched. Especially, in a case where both the outer cam and the inner cam slide with respect to one cam follower, high accuracy is required. Further, the clearance becomes small, and in such a case, not scratching the sliding surface is required.

Further, in the case of fixing the outer cam to the outer shaft by shrink fitting or the like, deformation occurs depending on interference, and thus deformation occurs in the entire camshaft. In a case of requiring high accuracy, it is conceivable to perform finish processing after assembly in order to remove the deformation. However, due to the finish processing, intrusion of chips and the like into a structure constituted by the inner cam, the pin, and the inner shaft occurs, and a complicated and expensive cleaning process is required or a masking process or the like not to allow the intrusion of the chips is required before processing. Therefore, post-assembly processing is basically not performed.

An objective of the present invention is to provide a camshaft capable of suppressing an increase in the number of components and the number of places to be processed, preventing scratching on the sliding surface that is a part of an outer circumferential surface of an outer shaft and on which an inner cam is rotated, and preventing occurrence of deformation in the entire camshaft after final assembly.

Means for Solving the Problems

To achieve the above objective, the present invention provides a camshaft including an outer shaft (for example, an outer shaft 10, 10A, or 10B described below); an outer cam (for example, an outer cam 20 described below) provided on the outer shaft; an inner shaft (for example, an inner shaft 30 described below) inserted inside the outer shaft; and an inner cam (for example, an inner cam 40 or 40B described below) configured to be co-rotated with the inner shaft, and to be rotated and slide with respect to the outer shaft on the outer shaft due to the co-rotation, wherein the inner cam is attached from a radial direction of the outer shaft and is fixed to the inner shaft with a pin (for example, a pin 51 described below) inserted in a cam surface of the inner cam from the radial direction of the outer shaft.

According to the present invention, the inner cam can be retrofitted to the outer shaft to which the outer cam is fixed. Therefore, finish processing and cleaning for the outer cam and a journal part can be performed with only the outer cam and the outer shaft, similarly to a conventional hollow camshaft not having a double structure. Therefore, occurrence of a chip-processing problem, such as penetration of chips between the outer shaft and the inner shaft can be prevented. Further, large deformation can be completely removed by the finish processing, and thus means associated with larger deformation than the shrink fitting can be employed as the method of fixing the outer cam, and the number of choices in manufacturing is increased.

Further, the inner cam can have a structure to embrace the outer shaft, and thus resistance to slipping out of the inner cam can be enhanced. Further, the inner cam sliding surface on which the inner cam is rotated can undergo the finish processing after fixation of the outer cam. Therefore, leaving scratches on the sliding surface can be prevented. Further, the outer shaft and the outer cam can be integrated. Therefore, occurrence of deformation in the entire camshaft can be prevented. In that case, the number of components and the number of places to be processed can be decreased, and complication of an assembly process can be prevented.

Then, the outer shaft (for example, the outer shaft 10 described below) includes a portion in which a notch (for example, a notch 121 described below) is formed and a general part in which the notch is not formed, the inner cam (for example, the inner cam 40 described below) has an approximate C shape, and an opening (for example, an opening 401 described below) width of the inner cam is smaller than a radius of the general part (for example, a general part 16 described below) of the outer shaft, and the inner cam is arranged to cause the notch to be inserted into the opening of the inner cam, to slide in an axial direction of the outer shaft, and to have an inner circumferential surface of the inner cam separated from the notch without facing the notch.

Therefore, the inner cam sliding surface is arranged in a position different from a peripheral-direction small-diameter part in which the notch is formed. Therefore, the amount of rotation in phase change can be made large regardless of presence of the notch. Further, the inner cam has the approximate C shape having a part necessary in using a composite profile of the inner cam and the outer cam. Therefore, the material unnecessary in manufacturing the inner cam can be reduced, waste of the material can be avoided, and a weight saving can be achieved.

Further, the inner cam has the approximate C shape having a length in the peripheral direction that is equal to or longer than a semicircle (180°) in a view in a shaft center direction of the outer shaft, and thereby the through hole 13 that the pin penetrates can be integrally formed in a diameter direction of the inner cam. Therefore, similarly to a case of an inner cam that surrounds a whole periphery of the inner cam sliding surface of an outer shaft, the inner cam can be securely fixed to the inner shaft with high reliability.

Then, the outer shaft (for example, the outer shaft 10A described below) includes a portion in which a notch (for example, the notch 121 described below) is formed and a general part (for example, the general part 16 described below) in which the notch is not formed, the inner cam (for example, the inner cam 40 described below) has an approximate C shape, and the opening (for example, the opening 401 described below) width of the inner cam is smaller than a diameter of the general part of the outer shaft, and the inner cam is arranged to cause the notch to be inserted in the opening of the inner cam, and to have the inner circumferential surface of the inner cam face the notch.

Therefore, the inner cam does not need to slide in the axial direction of the outer shaft after the notch in the outer shaft is inserted into the opening in the inner cam, and thus manufacturing of the camshaft can be made easy, and scratching the inner cam sliding surface which is a part of the outer shaft and on which the inner cam slides can be prevented.

Effects of the Invention

According to the present invention, a camshaft capable of preventing scratching on a sliding surface that is a part of an outer circumferential surface of an outer shaft and on which an inner cam is rotated, preventing occurrence of deformation in the entire camshaft after final assembly, and suppressing an increase in the number of components and the number of places to be processed can be provided.

PREFERRED MODE FOR CARRYING OUT THE INVENTION

Figure 1:
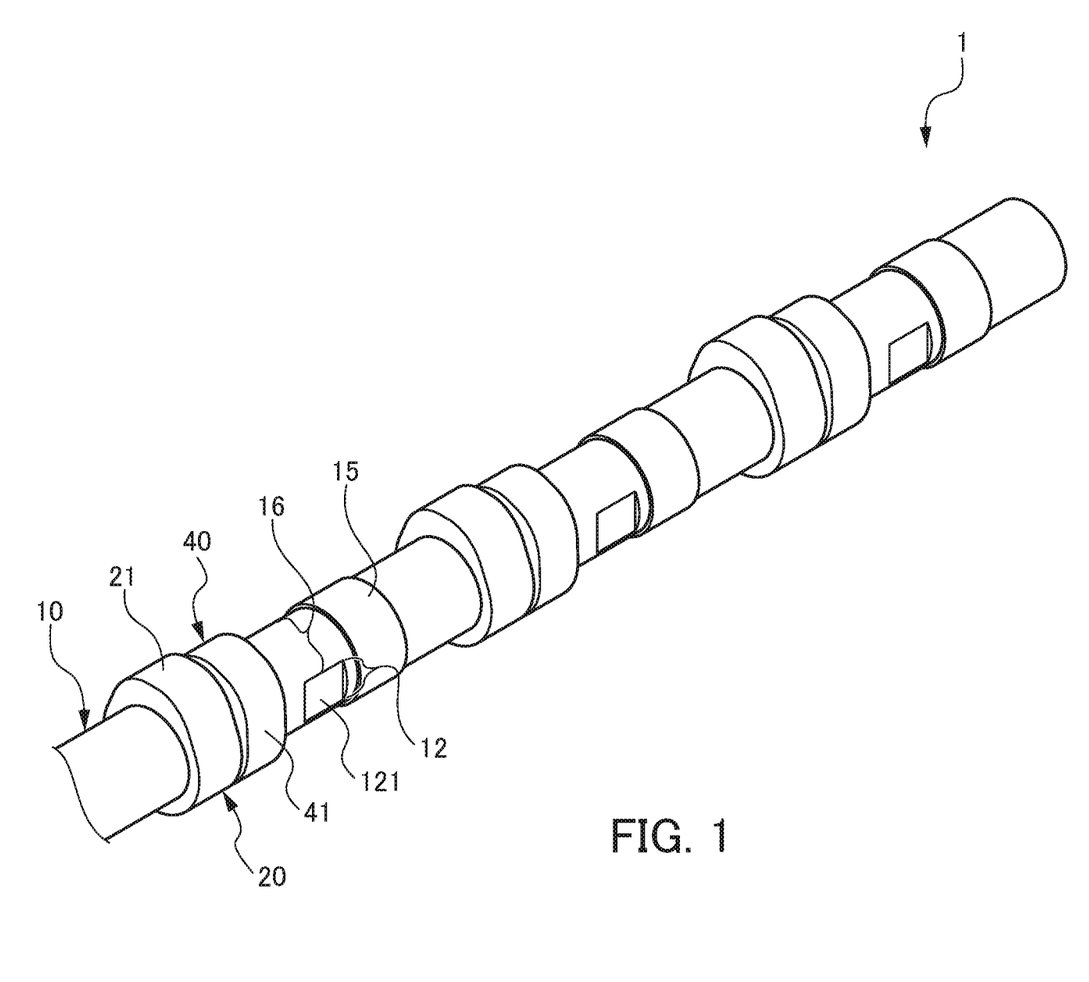
FIG. 1 is a perspective view illustrating a camshaft 1 according to a first embodiment of the present invention.
Figure 2:
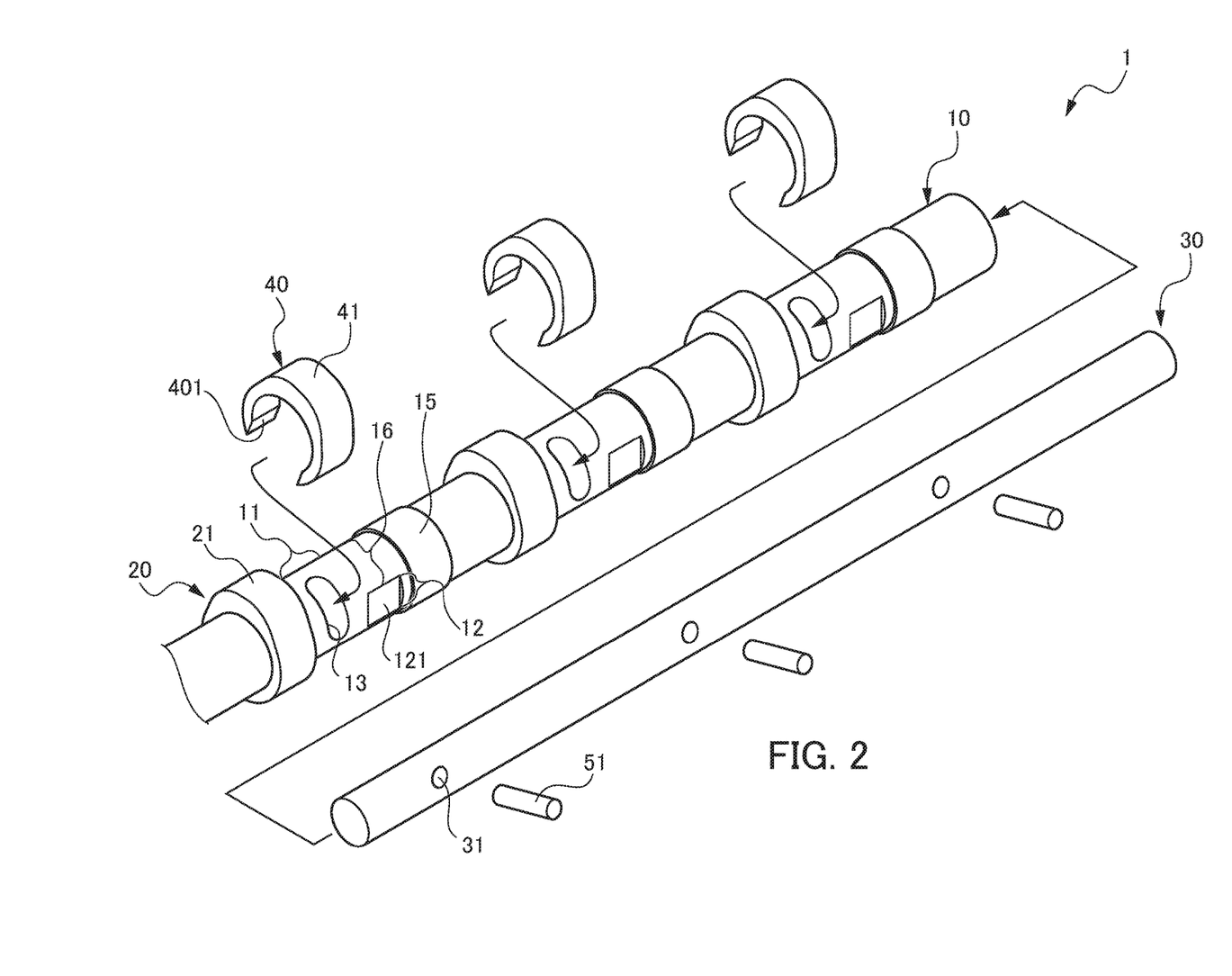
FIG. 2 is an exploded perspective view illustrating the camshaft 1 according to the first embodiment of the present invention.

A first embodiment of the present invention will be described with reference to the drawings. FIG. 1 is a perspective view illustrating a camshaft 1 according to the first embodiment of the present invention. FIG. 2 is an exploded perspective view illustrating the camshaft 1 according to the first embodiment of the present invention.

The camshaft 1 is used to open or close an intake or exhaust valve (not illustrated) arranged in an intake or exhaust port (not illustrated) communicating with a combustion chamber (not illustrated) of an engine of an automobile. An outer cam 20 and an inner cam 40 of the camshaft 1 come into contact with and slide with respect to one cam follower (roller) provided in a rocker arm (not illustrated) having one end part rotatably supported and the other end part configured to press an upper end of the valve downward, and the inner cam 40 rotates the rocker arm. With the operation, the valve arranged in the intake or exhaust port communicating with the combustion chamber is opened.

As illustrated in FIG. 1, the camshaft 1 includes an outer shaft 10, the outer cam 20, an inner shaft 30, and the inner cam 40. The outer shaft 10 has a hollow cylindrical shape. The outer cam 20 is integrally molded with the outer shaft 10, thereby to be fixed to and provided on the outer shaft 10. The outer cam 20 has an annular shape and has a coaxial positional relationship with the outer shaft 10. The outer cam 20 has a predetermined width in a shaft center direction of the outer shaft 10. Further, the outer cam 20 protrudes toward an outside of the outer shaft 10 from an outer circumferential surface of the outer shaft 10, and is circumferentially provided in a peripheral direction of the outer shaft 10. A part of the outer cam 20 in the peripheral direction of the outer cam 20 has a high part 21 protruding toward the outside of the outer shaft 10 further than the other parts of the outer cam 20 in a predetermined range in the peripheral direction of the outer shaft 10. The high part 21 comes into contact with the cam follower of the rocker arm (not illustrated) to rotate the rocker arm, thereby to open the valve (not illustrated).

The outer circumferential surface of the outer shaft 10, the outer circumferential surface being adjacent to the outer cam 20 in the shaft center direction of the outer shaft 10, has an inner cam sliding surface 11 (see FIG. 2). The inner cam 40 is rotated to slide on the inner cam sliding surface 11. A through hole 13 is formed in the part of the outer shaft 10, the part having the inner cam sliding surface 11. The through hole 13 is integrally formed at a diameter position of the outer shaft 10, has a slightly larger width than the diameter of a pin 51 described below, and extends to have a predetermined length in the peripheral direction of the outer shaft 10.

Figure 3A:
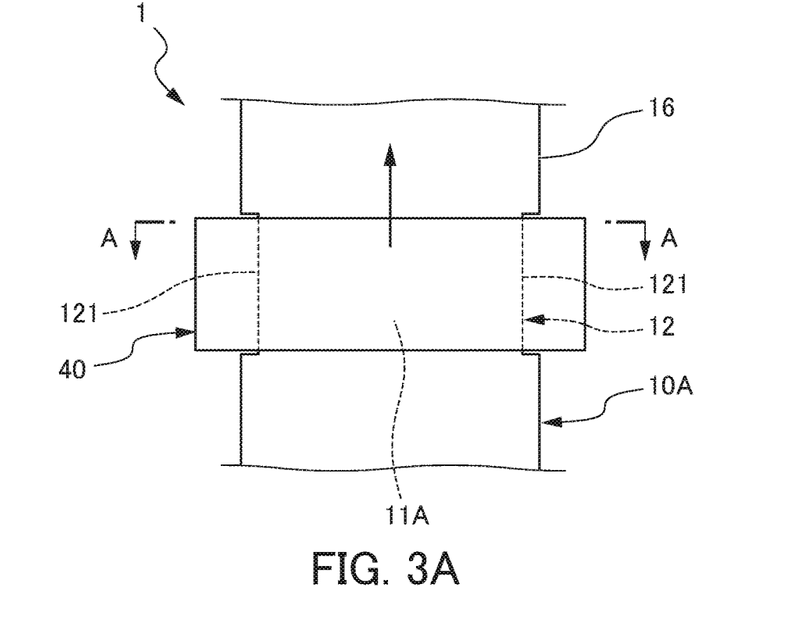
FIG. 3A is a principal part plan view illustrating the camshaft 1 according to the first embodiment of the present invention.
Figure 3B:
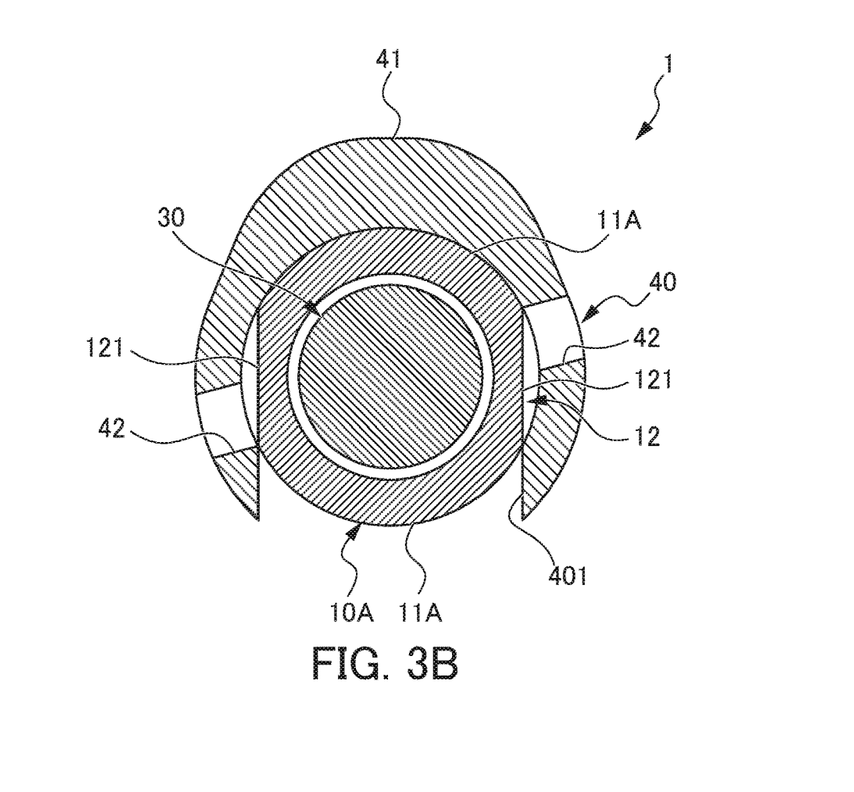
FIG. 3B is a sectional view along a line A-A in FIG. 3A.
Figure 3C:
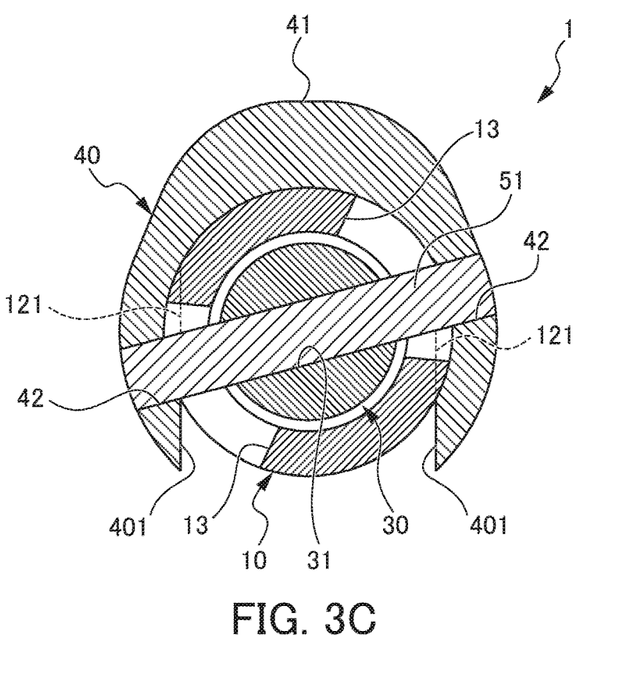
FIG. 3C is a sectional view illustrating the camshaft 1 according to the first embodiment of the present invention.

A peripheral-direction small-diameter part 12 is provided in a part of the outer shaft 10, the part being adjacent to the inner cam sliding surface 11 in the axial direction of the outer shaft 10, and the part being at a side opposite to the side where the outer cam 20 is provided. A notch 121 is formed in the peripheral-direction small-diameter part 12, the notch 121 partially constituting the outer diameter of the outer circumferential surface of the outer shaft 10 in a small manner in a part of the outer shaft 10 in the peripheral direction. As illustrated in FIG. 3C and the like, the notch 121 has a shape in which the outer circumferential surface of the outer shaft 10 is notched by a pair of planes parallel to the shaft center of the outer shaft 10, and by the pair of planes having the shortest distance between the pair of planes, the shortest distance being smaller than the outer diameter of the outer circumferential surface of the outer shaft 10. A part adjacent to the notch 121 in the peripheral direction of the outer shaft 10 constitutes a general part 16.

As illustrated in FIG. 1, a journal part 15 is provided on a part of the outer shaft 10, the part being adjacent to the peripheral-direction small-diameter part 12 where the notch 121 is formed in the axial direction of the outer shaft 10, and the part being on a side opposite to the side of the inner cam sliding surface 11. The journal part 15 exists in a part other than the outer cam 20, the inner cam sliding surface 11, and the peripheral-direction small-diameter part 12 in the axial direction of the outer shaft 10. The journal part 15 is rotatably supported with respect to a cylinder head (not illustrated).

As illustrated in FIG. 2, the inner shaft 30 has a solid or hollow columnar shape. The outer diameter of the inner shaft 30 is slightly smaller than the inner diameter of the outer shaft 10. The inner shaft 30 is inserted in an inner space formed by an inner circumferential surface of the outer shaft 10, and has a coaxial positional relationship with the outer shaft 10. An inner shaft through hole 31 penetrating the inner shaft 30 in a diameter direction is formed in a part of the inner shaft 30 facing the through hole 13 of the outer shaft 10.

As illustrated in FIG. 2 and the like, the inner cam 40 has an approximate C shape having a length in the peripheral direction equal to or longer than a semicircle (180°) in a view in the shaft center direction of the outer shaft 10, and has a coaxial positional relationship with the inner shaft 30. The width of an opening 401 of the approximately C-shaped inner cam 40 is larger than the shortest distance between the pair of parallel planes constituting the notch 121 in the peripheral-direction small-diameter part 12 and smaller than the diameter of the general part 16 of the outer shaft 10.

The inner cam 40 has a predetermined width in a shaft center direction of the inner shaft 30. FIG. 3A is a principal part plan view illustrating a state in which the notch 121 in the outer shaft 10 is inserted into the inner cam 40 of the camshaft 1 according to the embodiment of the present invention. FIG. 3B is a sectional view along a line A-A in FIG. 3A. FIG. 3C is a sectional view illustrating the camshaft 1 according to the first embodiment of the present invention. The inner cam 40 is attached to the outer circumferential surface of the outer shaft 10 from a radial direction of the outer shaft 10 as the peripheral-direction small-diameter part 12 is inserted into the opening 401 in the inner cam 40 in a positional relationship in which a shaft center of the inner cam 40 and the shaft center of the outer shaft 10 become parallel. Then, as illustrated by the upward arrow in FIG. 3A, the inner cam 40 is caused to slide with respect to the outer circumferential surface of the outer shaft 10 in the shaft center direction of the inner cam 40, and is attached to surround more than half in the peripheral direction of the portion of the outer shaft 10 having the inner cam sliding surface 11 separated from the peripheral-direction small-diameter part 12. A central part of the inner cam 40 in the peripheral direction of the inner cam 40 has a high part 41 protruding toward an outside of the outer shaft 10 further than the other parts of the inner cam 40 in a predetermined range in the peripheral direction of the outer shaft 10. The high part 41 comes into contact with the cam follower of the rocker arm (not illustrated) to rotate the rocker arm, thereby to open the valve (not illustrated).

As illustrated in FIG. 3C, an inner cam through hole 42 is formed in a cam surface of the inner cam 40. The inner cam through hole 42 is integrally formed in a diameter position of the inner cam 40 and in a part of the cam surface (unused part) of the inner cam 40 other than the high part 41. As illustrated in FIG. 3C, the inner cam through hole 42 is not formed to be in a symmetrical positional relationship in the peripheral direction of the outer shaft 10 with respect to the central part (high part 41) of the inner cam 40 in the peripheral direction of the outer shaft 10, in a cross-section in the axial direction of the outer shaft 10. The inner cam through hole 42 is formed to have a biased positional relationship with respect to the high part 41 (a positional relationship rotated about the shaft center of the outer shaft 10 by a predetermined angle) in the peripheral direction of the outer shaft 10.

The pin 51 penetrates the inner cam through hole 42. The pin 51 is inserted into the inner cam through hole 42 from an outside in the radial direction of the outer shaft 10, and fixes the inner cam 40 to the inner shaft 30. To be specific, the pin 51 penetrates the inner cam through hole 42, the through hole 13, the inner shaft through hole 31, the through hole 13, and the inner cam through hole 42 in that order, and is entirely press fitted into and fixed to or partially loosely fit into and engaged with the inner cam through hole 42 and the inner shaft through hole 31 and is fixed to the inner cam 40 and the inner shaft 30.

The pin 51 is movable in the through hole 13 in a longitudinal direction of the through hole 13 in the peripheral direction of the outer shaft 10. With the movement, the pin 51 and the inner cam 40 are integrally rotatable in the peripheral direction of the outer shaft 10 (rotatable about the shaft center of the outer shaft 10). As a result, the inner cam 40 is co-rotated with the inner shaft 30, and rotates and slides with respect to the outer shaft 10 on the outer shaft 10 with the co-rotation with the inner shaft 30.

Rotation of a crankshaft of an engine (not illustrated) is transmitted to the outer shaft 10 via a coupling device (not illustrated), and the outer shaft 10 is rotated. Further, torque is transmitted to the inner shaft 30 via a coupling device (not illustrated), and relative rotation to the outer shaft 10 is caused. With the relative rotation, a composite profile of the outer cam 20 and the inner cam 40 varies.

Figure 4:
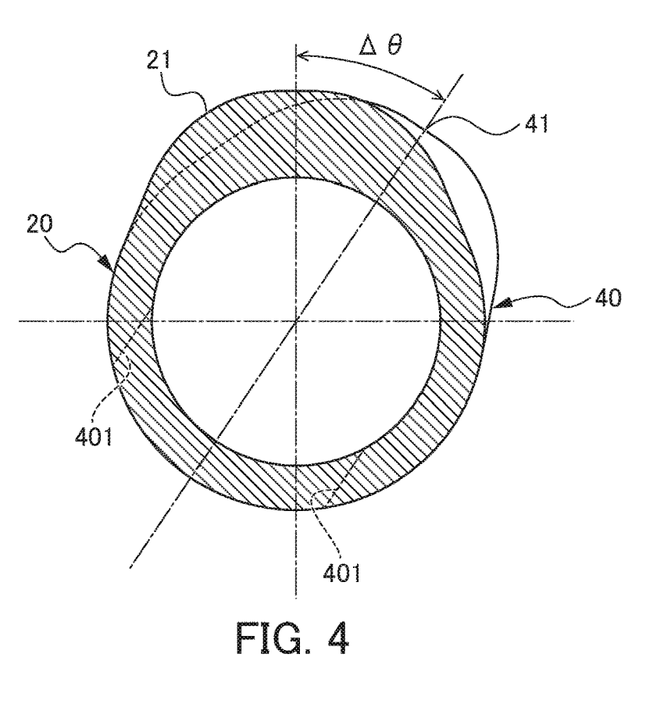
FIG. 4 is a schematic view illustrating a state in which a phase of an outer cam 20 and a phase of an inner cam 40 are shifted in a camshaft 1 according to all of the embodiments of the present invention.
Figure 5:
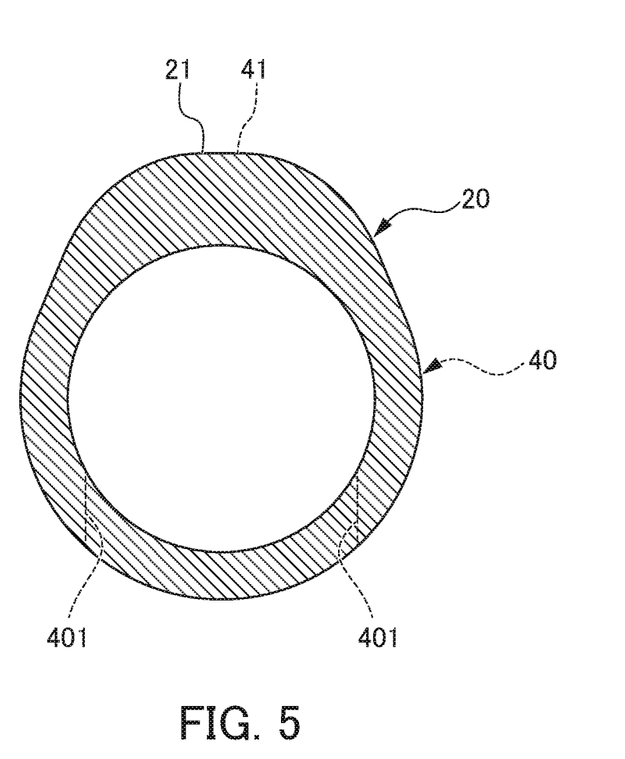
FIG. 5 is a schematic view illustrating a state in which the phase of the outer cam 20 and the phase of the inner cam 40 coincide with each other in the camshaft 1 according to all the embodiments of the present invention.
Figure 6:
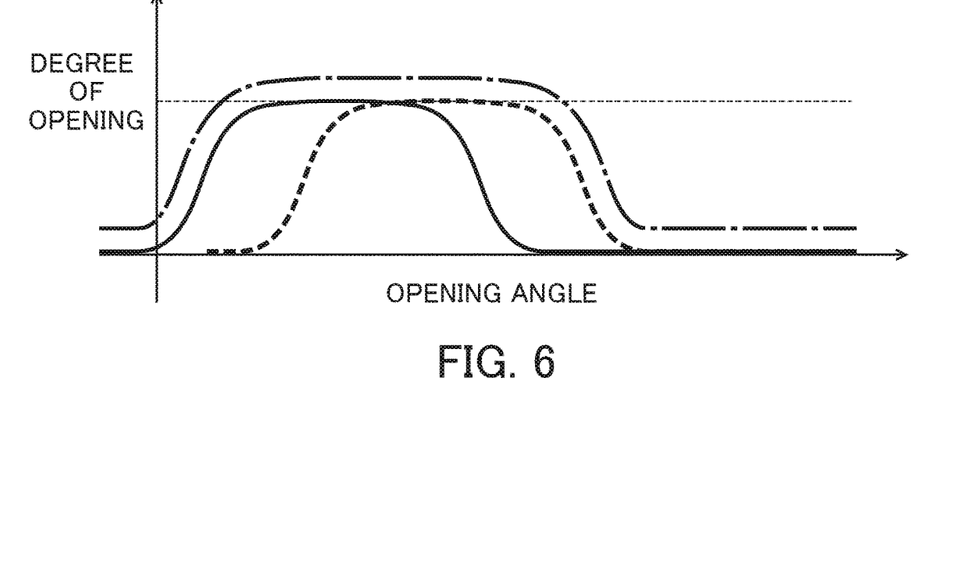
FIG. 6 is a graph illustrating characteristics of an opening angle of a valve in the state in which the phase of the outer cam 20 and the phase of the inner cam 40 are shifted in the camshaft 1 according to all the embodiments of the present invention.
Figure 7:
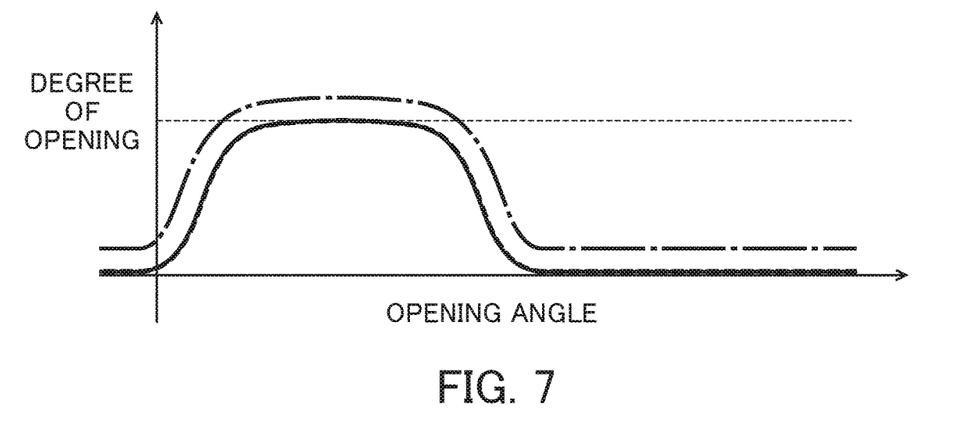
FIG. 7 is a graph illustrating characteristics of the opening angle of the valve in the state in which the phase of the outer cam 20 and the phase of the inner cam 40 coincide with each other in the camshaft 1 according to all the embodiments of the present invention.

An operation of the camshaft 1 having the above configuration will be described. FIG. 4 is a schematic view illustrating a state in which a phase of the outer cam 20 and a phase of an inner cam 40 are shifted in the camshaft 1 according to the first embodiment of the present invention. FIG. 5 is a schematic view illustrating a state in which the phase of the outer cam 20 and the phase of the inner cam 40 coincide with each other in the camshaft 1 according to the first embodiment of the present invention. FIG. 6 is a graph illustrating characteristics of an opening angle of a valve in the state in which the phase of the outer cam 20 and the phase of the inner cam 40 are shifted in the camshaft 1 according to the first embodiment of the present invention. FIG. 7 is a graph illustrating characteristics of the opening angle of the valve in the state in which the phase of the outer cam 20 and the phase of the inner cam 40 coincide with each other in the camshaft 1 according to the first embodiment of the present invention.

When the inner shaft 30 is rotated relatively to the outer shaft 10, and the inner cam 40 and the outer cam 20 have a positional relationship to coincide with each other in a view in the axial direction of the inner shaft 30 and the outer shaft 10, as illustrated in FIG. 5, a composite profile of a profile (the solid line in FIG. 7) of the outer cam 20 and a profile (the broken line in FIG. 7) of the inner cam 40 coincides with the sole profile (the solid line in FIG. 7) of the outer cam 20, as illustrated by the one-dot chain line in the graph in FIG. 7, and the opening angle becomes minimum.

When the inner shaft 30 is rotated relatively to the outer shaft 10, and the inner cam 40 and the outer cam 20 do not coincide with each other and have a positional relationship with a gap in the view in the axial direction of the inner shaft 30 and the outer shaft 10, the opening angle due to the composite profile of the profile of the inner cam 40 and the profile of the outer cam 20 becomes large. Then, further, when the inner shaft 30 is rotated relatively to the outer shaft 10, and the inner cam 40 and the outer cam 20 have a positional relationship in which the gap between the inner cam 40 and the outer cam 20 is maximum in the view in the axial direction of the inner shaft 30 and the outer shaft 10, as illustrated in FIG. 4, the opening angle is larger than the case illustrated in FIG. 7 where the opening angle is minimum by about $\Delta\theta$ (see FIG. 4) and is maximum in the composite profile of the profile (the solid line in FIG. 6) of the outer cam 20 and the profile (the broken line in FIG. 6) of the inner cam 40, as illustrated by the one-dot chain line in the graph in FIG. 6.

According to the present embodiment, the following effects are exhibited. In the present embodiment, the camshaft 1 includes the outer shaft 10, the outer cam 20 provided on the outer shaft 10, the inner shaft 30 inserted inside the outer shaft 10, and the inner cam 40 co-rotated with the inner shaft 30 and rotated and sliding with respect to the outer shaft 10 on the outer shaft 10 with the co-rotation with the inner shaft 30. The inner cam 40 is attached from the radial direction of the outer shaft 10, and is fixed to the inner shaft 30 with the pin 51 inserted into the inner cam 40 from the radial direction of the outer shaft 10 in the cam surface of the inner cam 40.

With the configuration, the inner cam 40 can be retrofitted to the outer shaft 10 to which the outer cam 20 is fixed. Therefore, finish processing and cleaning of the outer cam 20 and the journal part 15 can be performed with only the outer cam 20 and the outer shaft 10. Therefore, occurrence of a chip-processing problem, such as penetration of chips between the outer shaft 10 and the inner shaft 30, can be prevented.

Further, the inner cam 40 can be constituted to embrace the outer shaft 10. Therefore, resistance to slipping out of the inner cam 40 can be enhanced. Further, the inner cam sliding surface 11 on which the inner cam 40 is rotated can undergo the finish processing after fixation of the outer cam 20. Therefore, leaving scratches on the sliding surface can be prevented. Further, the outer shaft 10 and the outer cam 20 can be integrated. Therefore, occurrence of deformation in the entire camshaft 1 can be prevented. In that case, the number of components and the number of places to be processed can be decreased, and complication of assembly process can be prevented.

Then, the outer shaft 10 has the portion in which the notch 121 is formed and the general part 16 in which no notch 121 is formed. The inner cam 40 has the approximate C shape. The width of the opening 401 of the inner cam 40 is smaller than the diameter of the general part 16 of the outer shaft 10. The notch 121 is inserted into the opening 401 of the inner cam 40, the inner cam 40 is caused to slide in the axial direction of the outer shaft 10, and the inner cam 40 is arranged such that the inner circumferential surface of the inner cam 40 is separated from the notch 121 without facing the notch 121.

With the configuration, the inner cam sliding surface 11 is arranged in a position different from the peripheral-direction small-diameter part 12 in which the notch 121 is formed. Therefore, the amount of rotation in phase change can be made large regardless of presence of the notch 121.

Further, in use as the composite profile of the outer cam and the inner cam, only a part of the movable cam (inner cam) having a shifted phase from the fixed cam (outer cam) is used. Therefore, in a case of a whole peripheral shape (annular shape) that surrounds a whole periphery of the outer cam like a conventional case, there is a large unused part. In recent years, a relatively expensive high-hardness material is used as the cam material for improvement of pitching resistance. Therefore, the material goes to waste for the unused part. Further, a double cam structure has a tendency of an increase in weight due to an additional member for the movable cam.

In contrast, in the present embodiment, the inner cam 40 has the approximate C shape having the part necessary in using the composite profile. Therefore, the material unnecessary in manufacturing the inner cam 40 can be reduced, the waste of the material can be avoided, and a weight saving can be achieved.

Further, the inner cam 40 has the approximate C shape having the length in the peripheral direction that is equal to or longer than a semicircle (180°) in a view in the shaft center direction of the outer shaft 10. Therefore, the through hole 13 that the pin 51 penetrates can be integrally formed in the diameter direction of the inner cam 40. Therefore, similarly to the case of the inner cam that surrounds the whole periphery of the inner cam sliding surface 11 of the outer shaft 10, the inner cam 40 can be securely fixed to the inner shaft 30 with high reliability.

Figure 8A:
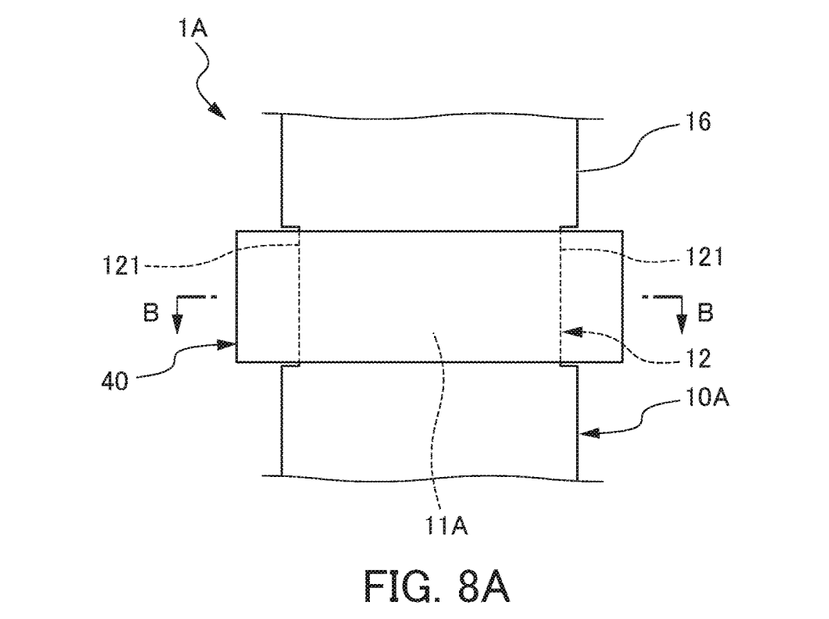
FIG. 8A is a principal part plan view illustrating a state in which a notch 121 of an outer shaft 10A is inserted in an inner cam 40 of a camshaft 1A according to a second embodiment of the present invention.
Figure 8B:
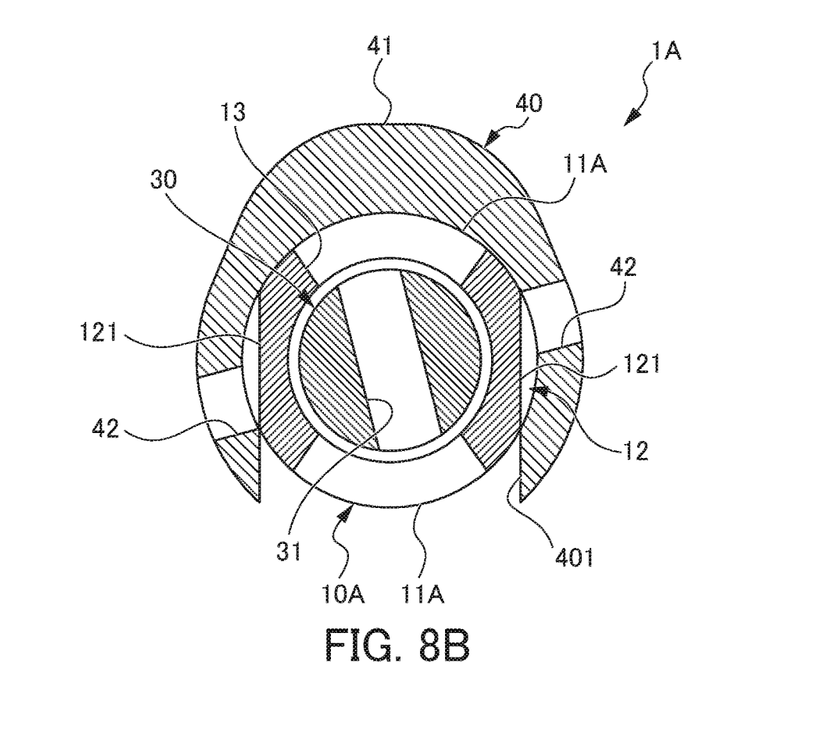
FIG. 8B is a sectional view along a line B-B in FIG. 8A.
Figure 8C:
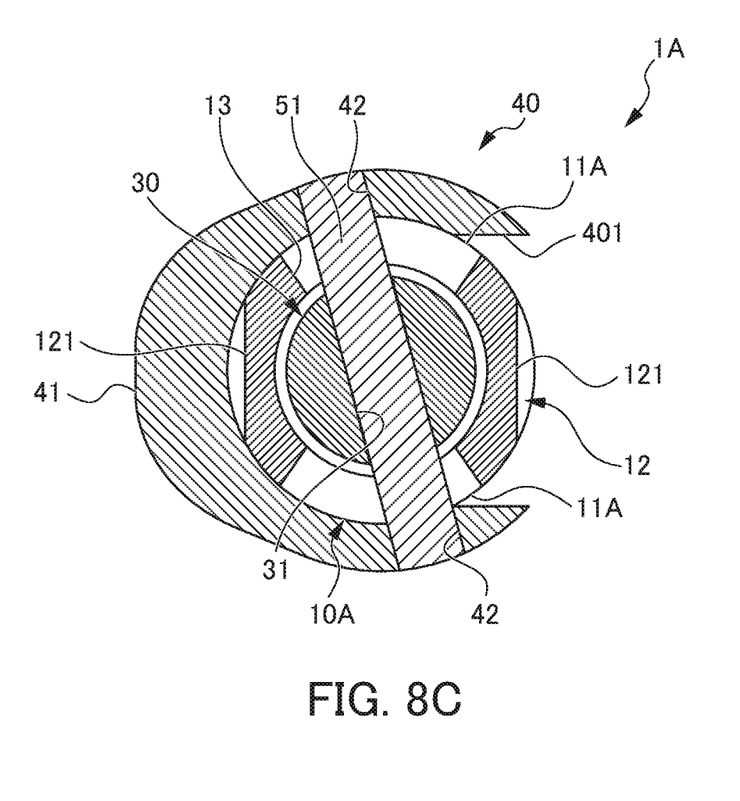
FIG. 8C is a sectional view illustrating a use state (after rotation by 90°) of the camshaft 1A according to the second embodiment of the present invention.

A second embodiment of the present invention will be described with reference to the drawings. Hereinafter, the same configuration as the first embodiment is designated by the same reference sign, and a detailed description of the configuration is omitted. An inner cam 40 according to the present embodiment is different from the first embodiment in that an inner circumferential surface of the inner cam 40 faces a peripheral-direction small-diameter part 12 in which a notch 121 is formed. FIG. 8A is a principal part plan view illustrating a state in which the notch 121 of an outer shaft 10A is inserted in an inner cam 40 of a camshaft 1A according to the second embodiment of the present invention. FIG. 8B is a sectional view along a line B-B in FIG. 8A. FIG. 8C is a sectional view along the line B-B after rotation by about 90°.

An inner cam sliding surface 11A of the outer shaft 10A does not exist over the whole periphery of the outer shaft 10A, and is constituted by a part other than the notch 121, as illustrated in FIG. 8B. After the peripheral-direction small-diameter part 12 with a partially small outer diameter of the outer shaft 10A due to formation of the notch 121 is inserted into an opening 401 in the inner cam 40 having an approximate C shape, as illustrated in FIG. 8B, and when the inner cam 40 is rotated in a peripheral direction of the outer shaft 10A by about 90° with respect to the outer shaft 10A, as illustrated in FIG. 8C, an inner circumferential surface of the inner cam 40 faces the notch 121 and the opening 401 of the inner cam 40 does not face the notch 121, and the inner cam 40 is mounted to the outer shaft 10A in a state of not coming off the outer shaft 10A.

According to the present embodiment, the following effects are exhibited. In the present embodiment, the outer shaft 10A includes the portion in which the notch 121 is formed and a general part 16 in which no notch 121 is formed. The inner cam 40 has the approximate C shape, and the width of the opening 401 of the inner cam 40 is smaller than the diameter of the general part 16 of the outer shaft 10A. The inner cam 40 is arranged in such a manner that the notch 121 is inserted in the opening 401 of the inner cam 40, and the inner circumferential surface of the inner cam 40 faces the notch 121.

With the configuration, the inner cam 40 does not need to slide in an axial direction of the outer shaft 10A after the notch 121 in the outer shaft 10A is inserted into the opening 401 in the inner cam 40, and thus manufacturing of the camshaft 1A can be made easy, and scratching the inner cam sliding surface 11A can be prevented. Further, in the present embodiment, the insertion place and the use place are the same. Therefore, the present embodiment can be applied to a camshaft without sufficient space in the axial direction.

Figure 9:
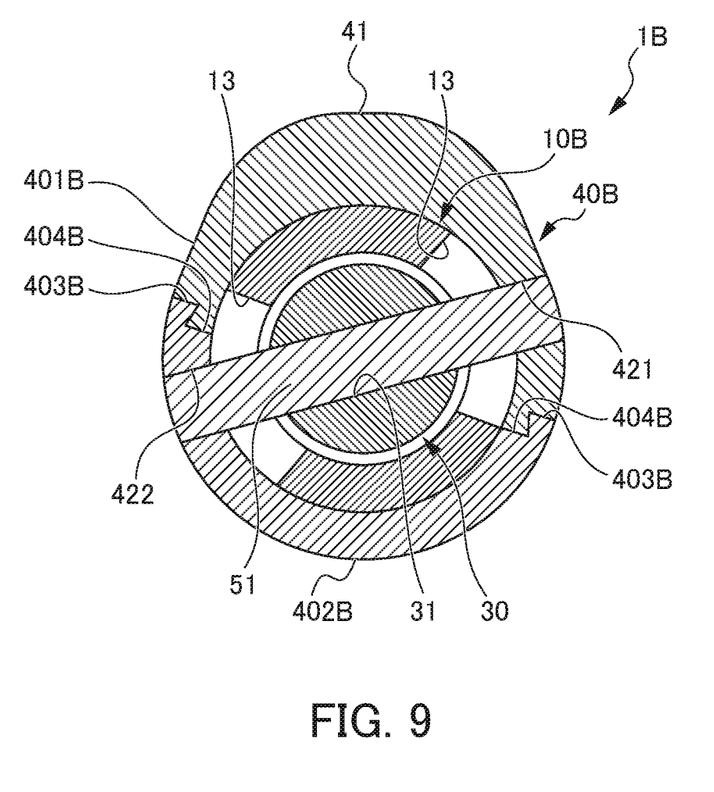
FIG. 9 is a sectional view illustrating a camshaft 1B according to a third embodiment of the present invention.
Figure 10A:
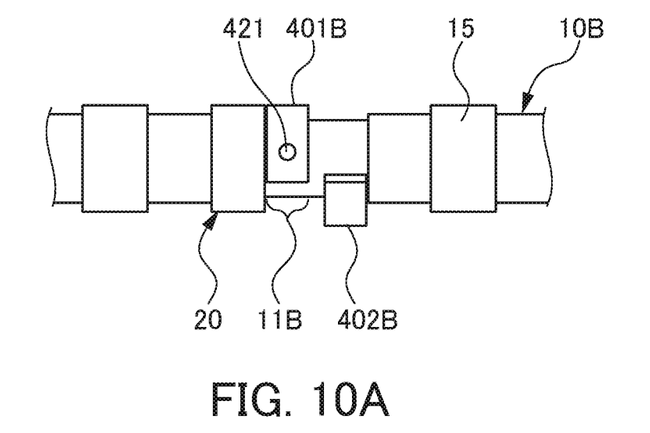
FIG. 10A is a side view illustrating a state in which an inner cam 40B is divided in a process of manufacturing the camshaft 1B according to the third embodiment of the present invention.
Figure 10B:
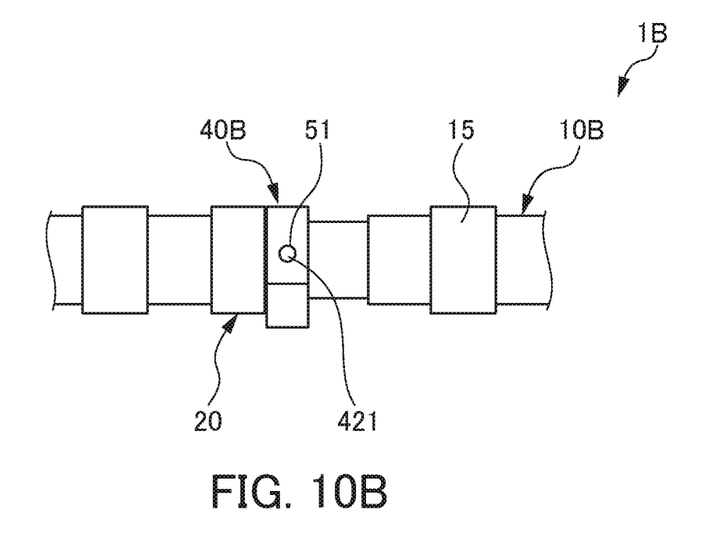
FIG. 10B is a side view illustrating a state in which the inner cam 40B is joined in the process of manufacturing the camshaft 1B according to the third embodiment of the present invention.

Next, a third embodiment of the present invention will be described with reference to the drawings. Hereinafter, the same configuration as the first embodiment is designated by the same reference sign, and a detailed description of the configuration is omitted. A camshaft 1B according to the present embodiment is different from the first embodiment in that an inner cam 40B has a half-divided shape. FIG. 9 is a sectional view illustrating the camshaft 1B according to the third embodiment of the present invention. FIG. 10A is a side view illustrating a state in which the inner cam 40B is divided in a process of manufacturing the camshaft 1B according to the third embodiment of the present invention. FIG. 10B is a side view illustrating a state in which the inner cam 40B is joined in the process of manufacturing the camshaft 1B according to the third embodiment of the present invention.

As illustrated in FIG. 9, the inner cam 40B has a half-divided shape including an inner cam first part 401B and an inner cam second part 402B dividable along an axial direction of the inner cam 40B. A divided surface of the inner cam 40B does not have a symmetrical positional relationship in the peripheral direction of the outer shaft 10B with respect to a central part (high part 41) of the inner cam 40B in the peripheral direction of the outer shaft 10B, in cross-section in an axial direction of the outer shaft 10B, and has a positional relationship biased by a similar extent to a first through hole 421 and a second through hole 422 described below to a direction opposite to a direction in which the first through hole 421 and the second through hole 422 are formed, with respect to the high part 41 in the peripheral direction of the outer shaft 10B (a positional relationship rotated by a predetermined angle with respect to a shaft center of the outer shaft 10).

To be more specific, as illustrated in FIG. 9, the divided surface of the inner cam 40B includes a high part 403B higher by one step upward in FIG. 9, which protrudes in such a manner that a part close to an outer circumferential surface of the inner cam 40B comes to a position close to the high part 41 in the peripheral direction of the inner cam 40B, in cross-section in the axial direction of the outer shaft 10B. A part close to an inner circumferential surface of the inner cam 40B of the divided surface of the inner cam 40B constitutes a low part 404B relatively lower by one step downward in FIG. 9. The high part 403B and the low part 404B form a so-called dovetail groove, and constitute a coupling part where the inner cam first part 401B and the inner cam second part 402B are coupled.

The inner cam first part 401B includes the high part 41. Further, the inner cam first part 401B includes the first through hole 421 that one end of the pin 51 penetrates and is fixed thereto. The inner cam second part 402B includes the second through hole 422 that the other end of the pin 51 penetrates and is fixed thereto. When the inner cam first part 401B and the inner cam second part 402B are coupled, and the inner cam 40B is fixed to the inner shaft 30 with the pin 51, the inner cam 40B is mounted to the outer shaft 10B to surround the whole periphery of an inner cam sliding surface 11B of the outer shaft 10B.

Fixation of the inner cam 40B to the inner shaft 30 and the mounting of the inner cam 40B onto the outer shaft 10B are performed as follows. First, as illustrated in FIG. 10A, the inner cam first part 401B is arranged on the inner cam sliding surface 11B of the outer shaft 10B. Further, the inner cam second part 402B is arranged in a part of the outer circumferential surface of the outer shaft 10B, and the part adjacent to the inner cam sliding surface 11B in a shaft center direction of the outer shaft 10B. At this time, the inner cam second part 402B is arranged at a diameter position of the outer shaft 10B with respect to the inner cam first part 401B in a view in the shaft center direction of the outer shaft 10B.

Next, the inner cam second part 402B is brought to slide in the shaft center direction of the outer shaft 10B along the outer circumferential surface of the outer shaft 10B, and is arranged on the inner cam sliding surface 11B. With the operation, as illustrated in FIG. 10B, the inner cam first part 401B and the inner cam second part 402B are coupled in the coupling part, and the annular inner cam 40B is arranged on the inner cam sliding surface 11B. Then, the pin 51 is brought to penetrate the first through hole 421, a through hole 13, an inner shaft through hole 31, the through hole 13, and the second through hole 422 in that order from an outside to an inside in a radial direction of the outer shaft 10B, and is press fitted into the first through hole 421, the inner shaft through hole 31, and the second through hole 422 and fixed to the inner cam 40B and the inner shaft 30.

According to the present embodiment, the following effects are exhibited. In the present embodiment, the inner cam 40B constituted by the inner cam first part 401B and the inner cam second part 402B surrounds the whole periphery of the inner cam sliding surface 11B of the outer shaft 10B. Therefore, uneven wear of the outer shaft 10B and the inner cam 40B can be suppressed. Further, the inner cam first part 401B and the inner cam second part 402B are coupled with the so-called dovetail groove. With the configuration, the inner cam first part 401B and the inner cam second part 402B can be reliably prevented from coming off, and the inner cam 40B can be reliably prevented from coming off the outer shaft 10B.

Next, a fourth embodiment of the present invention will be described with reference to the drawings. Hereinafter, the same configuration as the first embodiment is designated by the same reference sign, and a detailed description of the configuration is omitted. A camshaft 1C according to the present embodiment is different from the first embodiment in that a pin 51C does not penetrate an inner shaft 30C.

Figure 11:
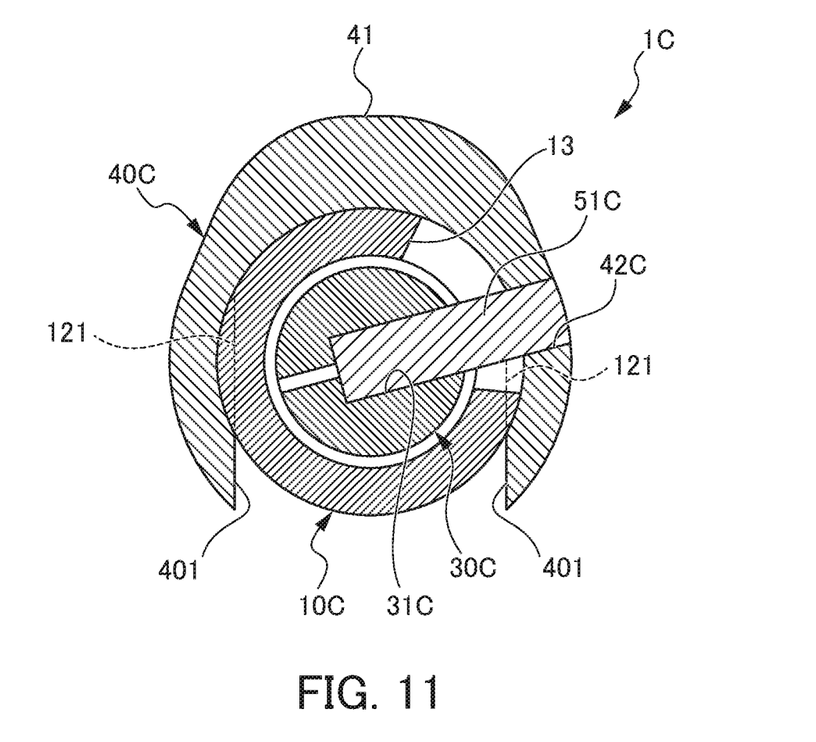
FIG. 11 is a sectional view illustrating a camshaft 1C according to a fourth embodiment of the present invention.

The pin may not penetrate the shaft as needed. Especially, in a case of using a clearance part between an outer shaft inner diameter and an inner shaft outer diameter as an oil passage, exposure of a through hole 13 from the inner cam 40C needs to be prevented. In that case, as illustrated in FIG. 11, an inner cam one-side through hole 42C is formed in a cam surface of the inner cam 40C. The inner cam one-side through hole 42C is formed in a diameter position of the inner cam 40C and is a portion in the cam surface (unused part) of the inner cam 40C other than a high part 41.

The pin 51C penetrates the inner cam one-side through hole 42C. The pin 51C is inserted into the inner cam one-side through hole 42C from an outside in a radial direction of an outer shaft 10C, and fixes the inner cam 40C to the inner shaft 30C. To be specific, the pin 51C is inserted into the inner cam one-side through hole 42C, a through hole 13, and an inner shaft stop hole 31C in that order, and is entirely press fitted into and fixed to or partially loosely fit into and engaged with the inner cam one-side through hole 42C and the inner shaft stop hole 31C and is fixed to the inner cam 40C and the inner shaft 30C.

According to the present embodiment, the following effects are exhibited. In the present embodiment, the pin 51C does not penetrate the inner shaft 30C, and thus the through hole 13 can be prevented from being exposed from the inner cam 40C, and the clearance part between the outer shaft inner diameter and the inner shaft outer diameter can be used as an oil passage.

The present invention is not limited to the present embodiments, and modifications, improvements, and the like within a range achieving the object of the present invention are included in the present invention. For example, the camshaft 1, 1A, or 1B has been used to open or close the valve arranged in the intake or exhaust port communicating with the combustion chamber of an engine of an automobile. However, the present invention is not limited thereto. Further, configurations of an outer shaft, an outer cam, an inner shaft, and an inner cam are not limited to the configurations of the outer shafts 10, 10A, and 10B, the outer cam 20, the inner shaft 30, and the inner cams 40 and 40B in the present embodiment.

The outer cam 20 may be inserted into the outer shaft 10 in the axial direction of the outer shaft 10 and positioned, and then fixed to the outer shaft 10 by shrink fitting or diameter expansion. Further, in the present embodiment, the inner cam 40 has been attached to the outer circumferential surface of the outer shaft 10 from the radial direction of the outer shaft 10. However, the direction is not limited to the radial direction. For example, the inner cam 40 may be attached to the outer circumferential surface of the outer shaft 10 from a diagonal direction with respect to the radial direction of the outer shaft 10.

EXPLANATION OF REFERENCE NUMERALS 1, 1A, 1B, and 1C Cam shaft
10, 10A, 10B, and 10C Outer shaft
16 General part
20 Outer cam
30 and 30C Inner shaft
40, 40B, and 40C Inner cam
51 and 51C Pin
121 Notch
401 Opening

The invention claimed is:
1. A camshaft comprising:
an outer shaft;
an outer cam provided on the outer shaft;
an inner shaft inserted inside the outer shaft; and
an inner cam configured to be co-rotated with the inner shaft, and to be rotated and slide with respect to the outer shaft on the outer shaft due to the co-rotation, wherein
the inner cam is attached to the outer shaft from a radial direction of the outer shaft and is fixed to the inner shaft with a pin inserted in a cam surface of the inner cam from the radial direction of the outer shaft,
the outer shaft includes a portion in which a notch is formed and a general part in which the notch is not formed,
the inner cam has an approximate C shape, and an opening width of the inner cam is smaller than a diameter of the general part of the outer shaft, and
the inner cam is arranged to cause the notch to be inserted in the opening of the inner cam, and to have an inner circumferential surface of the inner cam face the notch.
2. A camshaft comprising:
an outer shaft;
an outer cam provided on the outer shaft;
an inner shaft inserted inside the outer shaft; and
an inner cam configured to be co-rotated with the inner shaft, and to be rotated and slide with respect to the outer shaft on the outer shaft due to the co-rotation, wherein
the inner cam is attached to the outer shaft from a radial direction of the outer shaft and is fixed to the inner shaft with a pin inserted in a cam surface of the inner cam from the radial direction of the outer shaft,
the outer shaft includes a portion in which a notch is formed and a general part in which the notch is not formed, the inner cam has an approximate C shape, and an opening width of the inner cam is smaller than a diameter of the general part of the outer shaft, and the inner cam is arranged to cause the notch to be inserted into the opening of the inner cam, to be caused to slide in an axial direction of the outer shaft, and to have an inner circumferential surface of the inner cam separated from the notch without facing the notch.

\* \* \* \* \*